– – –

United States Patent [19]

Slivka

[11] 4,010,467
[45] Mar. 1, 1977

[54] MISSILE POST-MULTIPLE-TARGET RESOLUTION GUIDANCE

[75] Inventor: Lawrence P. Slivka, Santa Monica, Calif.

[73] Assignee: The United States of America as represented by the Secretary of the Navy, Washington, D.C.

[22] Filed: Mar. 2, 1972

[21] Appl. No.: 231,430

[52] U.S. Cl. .......................... 343/7.4; 235/150.27; 244/3.16; 244/3.19; 343/7 A; 343/117 R

[51] Int. Cl.² ................ F42B 15/02; G01S 7/46; G01S 9/02

[58] Field of Search .................. 244/3.16, 3.19; 343/7.4, 7 A, 117 R; 235/150.26, 150.27

[56] References Cited

UNITED STATES PATENTS

| | | | |
|---|---|---|---|
| 2,557,401 | 6/1951 | Agins et al. | 343/7.4 X |
| 3,064,924 | 11/1962 | Fairbanks | 235/150.27 X |
| 3,099,005 | 7/1963 | Goldberg | 343/7 A |
| 3,130,402 | 4/1964 | Kuck | 343/7.4 |
| 3,316,548 | 4/1967 | D'Amico | 343/117 R X |
| 3,321,761 | 5/1967 | Biagi et al. | 343/117 R |

Primary Examiner—Malcolm F. Hubler
Attorney, Agent, or Firm—R. S. Sciascia; G. J. Rubens; T. M. Phillips

[57] ABSTRACT

A feedback loop for use in the guidance system of a guided missile being flown against multiple targets. The feedback loop modifies a transient signal present in the system by introducing a time lag sufficient to cause the missile relative heading change command signal subsequent to target resolution to be equal to the change in the missile antenna-to-target pointing vector that occurs at resolution.

3 Claims, 2 Drawing Figures

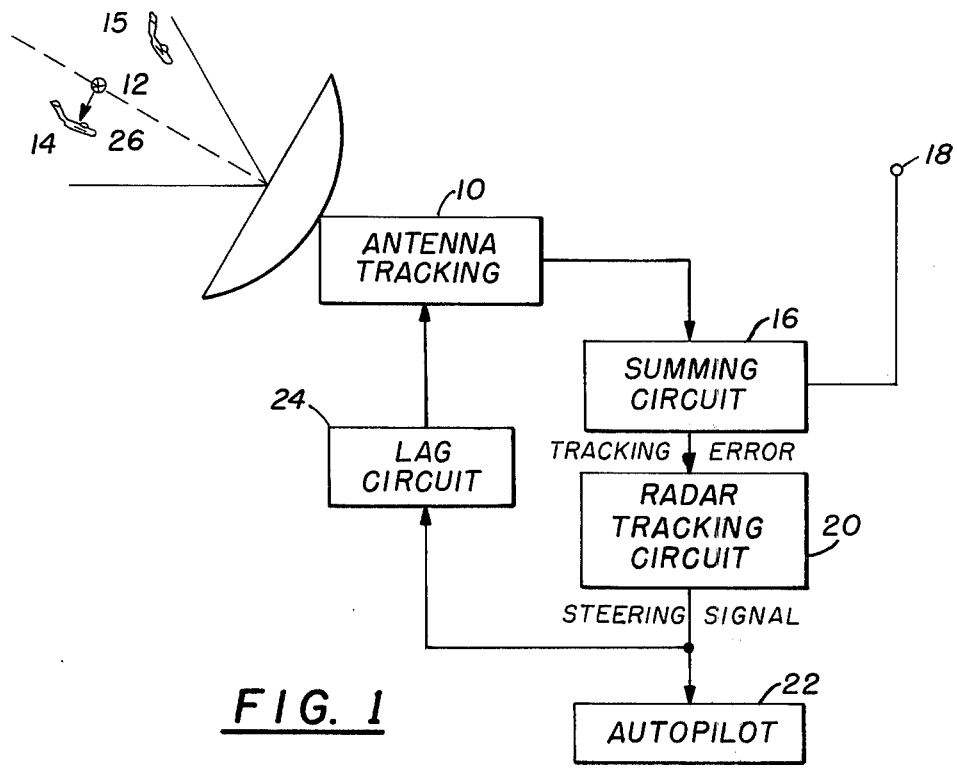
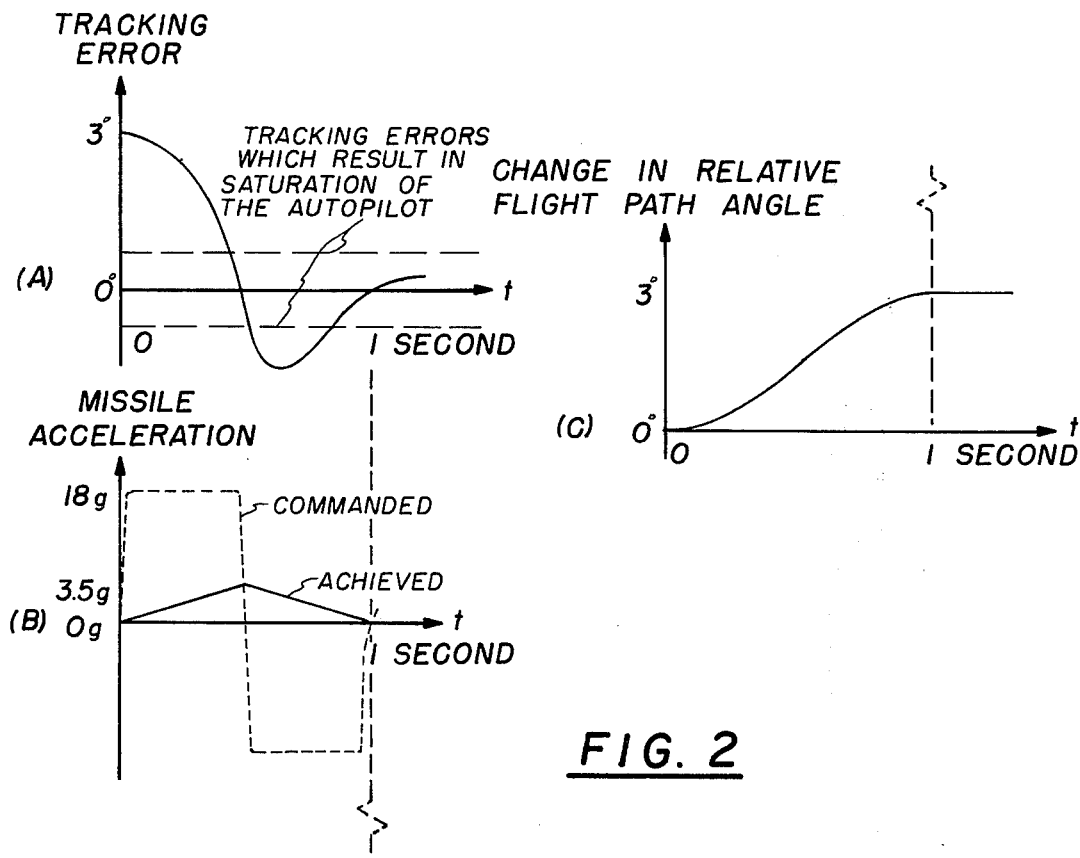

MISSILE POST-MULTIPLE-TARGET RESOLUTION GUIDANCE

BACKGROUND OF THE INVENTION

A present tactic of aircraft pilots in avoiding attacking missiles is to fly in formation of even numbers of aircraft with appropriate spacing between aircraft. This is a very effective tactic and all missiles have some decrease in effectiveness in encounters of this type. When more than one target aircraft are in the missile's field of view, the missile will generally guide toward the centroid of the targets. Prior to impact, resolution occurs, after which only one target is in the missile's field of view. At time of resolution, the missile is heading towards the centroid of the multiple targets, while the antenna is pointing towards a single target.

In the past the change in missile antenna-target pointing direction that occurs at resolution has previously been considered an undesired transient, and some prior missile designs would ground all inputs to the missile autopilot during transient. In this case, the missile heading error subsequent to resolution would have an angular value equal to the angular value of the change in pointing, and the quite slow missile navigation loop (including the feedback from encounter geometry) would then have to provide signals that would tend to cause the missile to reduce its heading error toward zero. Usually, because of insufficient remaining time of flight, large misses would result. On the other hand, other missile designs allow the pointing transient signal to pass, unchanged, to the missile autopilot. A missile of this design would, because of the navigation gain (numerical value of approximately 4), quickly negotiate a heading change of about 4 times the pointing change, resulting in a net heading error of about 3 times the pointing change but opposite in sense. Again, as above, the quite slow missile navigation loop would then have to develop guidance signals to tend to reduce the missile heading error towards zero. The above mentioned tactics against missiles of these designs have resulted in miss distances up to approximately 90 feet.

SUMMARY OF THE INVENTION

The present invention provides a means for modifying the transient signal generated by the change in the missile antenna pointing direction that occurs at resolution in a multiple target encounter to a signal that will effect a change in direction of the missile to impact with a selected target. This is done by adding a small delay in the feedback path of the antenna tracking loop.

STATEMENT OF THE OBJECTS OF THE INVENTION

An object of the present invention is to provide a tracking loop configuration which improves the post-resolution guidance performance of a missile encountering multiple targets.

Another object of the invention is to provide an improved tracking loop for use in a guided missile wherein a delay is added in the antenna tracking loop to provide an underdamped response in the guidance signal.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 1 is a block diagram of a preferred embodiment of the invention;

FIG. 2 shows waveforms of time histories of some missile variables subsequent to resolution.

Referring to FIG. 1 there is shown in block diagram the elevation channel of a missile tracking system. The system comprises an antenna 10 tracking the centroid 12 of multiple targets 14, 15. The output of antenna 10 is fed to a summing circuit 16 where it is summed with a reference signal at terminal 18 proportional to the elevation of line of sight of the missile above the horizon. The output from summing circuit is the tracking error signal and is processed in a conventional manner in antenna and radar signal processing circuit 20 to generate a steering signal for the autopilot 22. The system described thus far is a common missile tracking system, well known in the art, and forms no part of the invention. As shown in FIG. 1 the steering signal is coupled through a lag or filter circuit 24 to antenna 10. In order to produce the desired underdamped tracking response, the time lag of lag circuit 24 should be approximately equal to the reciprocal of the tracking loop gain. The tracking error response to a step change in line-of-sight direction (representing resolution) is the underdamped waveform shown in FIG. 2a. Resolution is when all but one of the targets drop out of the antenna beam and tracking shifts from the centroid 12 to a single target and thus the step change. The tracking errors at which autopilot 22 saturates are indicated by dashed lines (FIG. 2a). Assuming autopilot 22 is of the single-time-lag type, the commanded and achieved missile lateral accelerations are shown in FIG. 2b. The change in heading of the missile-target relative velocity vector is the area under the missile achieved acceleration curve divided by the missile velocity, and the time history of this quantity is shown in FIG. 2c. It is seen from FIG. 2, that in response to a resolution step input, the tracking loop executes an underdamped response, the missile autopilot develops a lateral acceleration and then reduces the acceleration to zero, and the missile-target relative velocity vector changes heading by an amount about equal to the change in pointing (vector 26, FIG. 1) of the antenna occurring at resolution.

Obviously many modifications and variations of the present invention are possible in the light of the above teachings. It is therefore to be understood that within the scope of the appended claims the invention may be practiced otherwise than as specifically described.

What is claimed is:

1. In an infrared tracking loop for use in the guidance system of a guided missile against multiple targets, the combination comprising:
   a. an input terminal adapted to receive signals proportional to heading of the guided missile with respect to a reference plane,
   b. a tracking antenna means for generating output signals proportional to the pointing direction of said antenna with respect to said reference plane,
   c. a summing circuit coupled to said input terminal and to said tracking antenna for providing an output tracking error signal,
   d. signal processing circuit means coupled to said summing circuit means for generating an output steering signal, e. time lag circuit means coupled between the output of said signal processing means and said tracking antenna means and being responsive to a step change in the output signal from said antenna tracking means to provide a feedback signal to cause said steering signal to be equal to said step change.

2. The improved tracking loop of claim 1 wherein the time lag of said time lag circuit is of a value to provide an underdamped response in the tracking loop.

3. The improved tracking loop of claim 2 wherein said time lag circuit provides a time lag approximately equal to the reciprocal of the gain of the tracking loop.

* * * * *